June 10, 1969  C. G. C. BUSCK  3,449,701
SPRING ASSEMBLY FASTENING DEVICE

Filed Jan. 11, 1967  Sheet 1 of 2

INVENTOR.
CARL GUSTAF CHRISTIAN BUSCK
BY Hane and Nydick
ATTORNEYS

June 10, 1969  C. G. C. BUSCK  3,449,701
SPRING ASSEMBLY FASTENING DEVICE
Filed Jan. 11, 1967  Sheet 2 of 2

INVENTOR.
CARL GUSTAF CHRISTIAN BUSCK
BY Hane and Nydick
ATTORNEYS 3,449,701
SPRING ASSEMBLY FASTENING DEVICE
Carl Gustaf C. Busck, Hagersten, Sweden, assignor to Telefonaktiebolaget L M Ericsson, Stockholm, Sweden, a corporation of Sweden
Filed Jan. 11, 1967, Ser. No. 608,635
Claims priority, application Sweden, Mar. 11, 1966, 3,229/66
Int. Cl. H01h 1/48, 1/50
U.S. Cl. 335—197                    5 Claims

ABSTRACT OF THE DISCLOSURE

A relay contact spring assembly is releasably attached to the relay yoke by mounting the contact springs on a base plate which has at one end a lug engageable with a mounting hole in the yoke and is slid at the other end beneath the overhanging head of a retaining member secured to the yoke whereby upon bending up the plate end having the lug so that the lug is clear of the hole the assembly can be detached from the yoke as a unit by simply pulling the other plate end clear of the head of the retaining member.

---

The present invention concerns a device for fastening spring assemblies in which the spring assembly is arranged on a base plate which is adapted to be fastened on the so-called relay yoke included in the relay.

For the fastening of spring assemblies on electromagnetic relays a screw passing through the whole spring assembly is often used which screw is screwed firmly into a hole made in the relay yoke. The relays are most frequently fastened side by side on a so-called relay strip. These strips are placed above each other in a frame. The space between the relays, vertically as well as laterally, then becomes very small. For exchange of a spring assembly of a relay mounted in this manner it is necessary to detach the strip on which the assembly to be exchanged is fastened from the frame. Furthermore one is sometimes also necessary to detach the relay from the relay strip before the spring assembly can be removed from the relay. This is a difficult and time consuming procedure.

Therefore it would be desirable to be able to effect an exchange of spring assemblies without having to detach the relay strip and possibly also the relay. The invention has consequently for a purpose to provide a relay spring assembly which can be exchanged for another assembly directly in the frame without having to unscrew and reinsert a fixing screw. A condition for a spring assembly to be exchangeable in this way is that it must be possible to mount it in the holes that are already existing in the relay yoke. A spring assembly in accordance with the invention is characterized principally by the fact that the base plate of the spring assembly is at its one end provided with a first fork-like means which is adapted to grip a support arranged on the relay yoke, for example a screw or rivet, and at its other end is provided with a second means, for example a stud which, upon the insertion of the fork under said support, is adapted to engage with a hole made in the relay yoke, and that the base plate is bent in such a way that it becomes securely fixed between said support and the upper side of the relay yoke.

Figure 1:
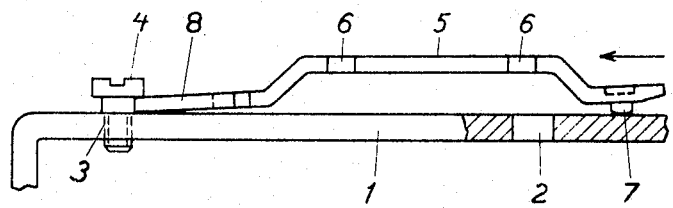
Figure 2:
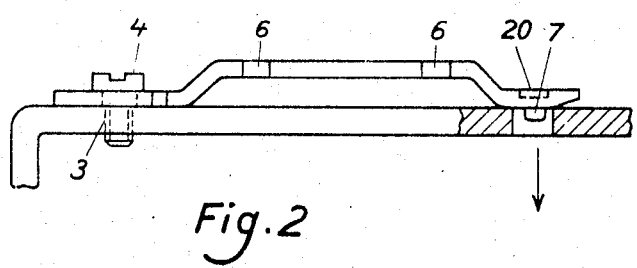
Figure 3:
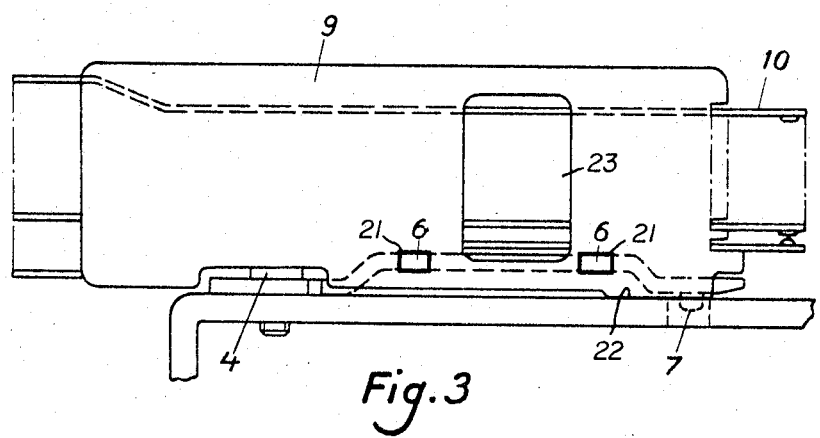
Figure 4:
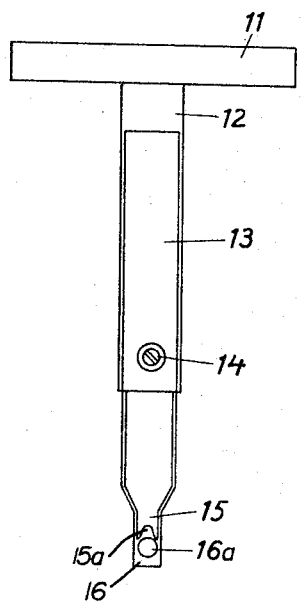
Figure 5:
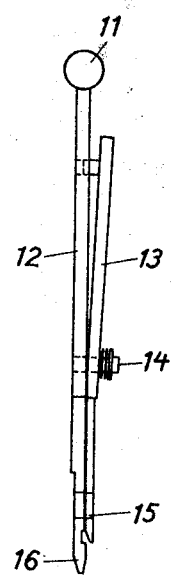

The invention will be described in more detail in connection with the attached drawings on which FIG. 1 shows how the base plate is being fixed to the relay yoke, FIG. 2 shows the base plate fixed to the relay yoke, FIG. 3 shows the base plate arranged on the relay yoke and side plates and contact springs arranged on the plate, FIG. 4 shows a plan view of a tool for the fastening and releasing of the spring assembly, and FIG. 5 an edge view of the tool.

FIG. 1 shows a relay yoke 1 provided with holes 2 and 3. The hole 3 is threaded. These holes are already existing on the relay yokes in order to facilitate a fastening of hitherto used types of spring assemblies. Into the hole 3 is screwed a shouldered and beaded screw 4. The back portion of a base plate 5 ending in a fork 8 fitted beneath the bead of the screw. In the front portion of the base plate which serves to support the contact spring assembly of the relay, there is arranged a stud 7 which is intended to engage hole 2 when the end of the fork 8 is inserted under the screw head 4. The back portion 8 of the base plate of the spring assembly is bent in such a way that the base plate forms an acute angle with the support which is formed by the upper side of the relay yoke 1. Due to such bending of the base plate and when its fork-like end 8 is inserted under the screw 4 so that the stud 7 engages the hole 2, said plate will be fixed between the screw and the upper side of the relay yoke. The base plate now occupies the position shown on FIG. 2.

In the embodiment shown the base plate is further bent in such a way that its straight mid portion 5 does not rest against the yoke. This straight portion of the base plate is provided at each side with holes 6 by means of which the side plates 9 of the spring assembly are mounted. In FIG. 3 is shown how side plates 9 of insulation material are fastened by rivets 21 to the base plate of the spring assembly. Between the side plates 9 contact springs 10 are fastened by means of riveting. The forward vertical edge of the side plates 9 is designed as a supporting rib for the contact springs 10, and hence only one lifting bar 23 will be necessary for the spring assembly. The forward portion of the side plates 9 is further so designed that the forward end 22 of the lower edge of the side plates rests directly against the upper side of the relay yoke. Due to this arrangement the smallest possible distance variation between lifting rib and lifting means on the armature bracket of the relay is achieved.

Thus a spring assembly in accordance with the invention can be detached together with on its plate from the frame by lifting the forward end of the spring assembly plate just enough for the stud 7 to clear the hole 2 and the spring assembly can then be pulled in the longitudinal direction of the relay, so that the fork end 8 is released from the support screw 4. The entire spring assembly may now be pulled forward so far that the connecting conductors of the contact springs 10 can be soldered off.

An embodiment of a tool adapted for releasing and fastening the spring assembly is shown in FIGS. 4a and 4b. The tool includes a grip 11 fixedly secured to a bar 12 on which a movable bar 13 is mounted. The bar 13 is held on bar 12 by means of a resilient screw 14. The end portions 16 and 15 respectively of the bars 12 and 13 are so designed that they can grip the forward portion of the spring assembly base plate mounting stud 7. The back portion of the movable bar 13 is bent relatively to the fixed bar 12 so that the portions 15 and 16 are separated when the bar 13 is pressed down and the portion 15 is pushed underneath the forward, bevelled lower edge of the spring assembly base plate. The portion 15 is pushed in so far that a recess 15a of the portion 15 rests against the stud 7. A protuberance 16a on the portion 16 of the tool sways when portion 13 is released into a recess 20 which is arranged on the upper side of the spring assembly base plate above the stud 7.

By means of a spring assembly base plate in accordance with the invention it is thus possible to change a spring assembly mounted on the relay without disassembling either the relay strip from the frame or the relay from the relay strip. No changes in conventional constructions need to be made as the spring assembly is designed in such a way that it can be placed in the same holes as are arranged for the fastening of known types of spring assemblies.

I claim:

1. A contact-spring assembly releasably mountable on a relay yoke, said spring assembly comprising in combination:

a relay yoke having a support surface including a mounting hole;

a retaining member having an overhanging portion protruding from the yoke with said overhanging portion spaced apart from the support surface of the yoke;

a base plate having on one of its sides and adjacent to one end of the plate a lug engageable with said mounting hole of the yoke whereby upon engagement of the lug with said hole and placement of the opposite end of the plate beneath said overhanging portion of the retaining member the base plate is releasably secured upon the yoke;

side plates secured at opposite edges of the base plate normal to the plane thereof; and an array of contact-springs disposed between said side plates, the fixed ends of said springs being secured to the side plates at the ends thereof juxtaposed to said retaining member.

2. The assembly according to claim 1 wherein said retaining member comprises a shouldered and headed screw threaded into a hole of the yoke.

3. The assembly according to claim 1 wherein said base plate is bent twice cross-wise to form a flat mid portion elevated with reference to the end portions of the plate thereby effecting springness of the plate.

4. The assembly according to claim 1 wherein the end portion of the plate engageable with said retaining member is forked, the branches of said forked end straddling the retaining member when said portion is placed beneath the overhanging portion of said retaining member.

5. The assembly according to claim 1 wherein said side plates are extended below the level of the base plate at the end thereof mounting said lug so as to cause engagement of said extended side plate portions with the surface of the yoke when the base plate is attached thereto.

References Cited

UNITED STATES PATENTS

| | | | |
|---|---|---|---|
| 1,311,460 | 7/1919 | Patten | 335—203 |
| 2,077,091 | 4/1937 | Brander | 335—124 |
| 2,547,062 | 4/1951 | Towner | 335—203 |
| 2,640,895 | 6/1953 | Boswau | 335—125 |
| 3,255,334 | 6/1966 | Fischer | 200—166.1 |

FOREIGN PATENTS

| | | |
|---|---|---|
| 697,758 | 9/1953 | Great Britain. |
| 1,011,586 | 12/1965 | Great Britain. |

BERNARD A. GILHEANY, *Primary Examiner.*

H. BROOME, *Assistant Examiner.*